United States Patent Office 3,141,304
Patented July 21, 1964

3,141,304
SOIL STABILIZATION BY ATACTIC
POLYPROPYLENE COATING
Howard V. Moore, Austin, Tex., assignor to Jefferson Chemical Company, Inc., Houston, Tex., a corporation of Delaware
No Drawing. Filed Nov. 14, 1960, Ser. No. 68,634
1 Claim. (Cl. 61—36)

This invention relates to atactic polypropylene compositions and to a method for the preparation of the same. More particularly, this invention relates to products of improved physical properties and to a method for preparing such products.

Polypropylene can be polymerized to form high molecular weight polymers when contacted in a reaction zone in the presence of an organic diluent such as an aromatic or an aliphatic hydrocarbon with a catalyst composition prepared by reacting a transition metal compound such as titanium tetrachloride with a metal activator such as diethyl aluminum chloride, triethyl aluminum, etc. One of the major products of the polymerization reaction is a normally solid, thermoplastic, isotactic propylene polymer, which may be used for the preparation of fibers, films and molded objects.

Another product of the polymerization reaction is an atactic polypropylene which is essentially amorphous in nature and which has a number average molecular weight of about 1,000 to 100,000 or more as determined from intrinsic viscosity in Decalin at 135° C. by the method of Ciampa [Chim.e.ind. (Milan), 38, 298 (1956)]. Atactic polypropylene differs from isotactic polypropylene in that the atactic polypropylene is soluble at ambient temperature in organic diluents whereas the isotactic polypropylene is substantially insoluble.

Although much attention has been given to the utilization of isotactic polypropylene, very little attention has been given to atactic polypropylene and the principal use suggested heretofore has been as a softening agent for isotactic polpropylene.

It has now been discovered, however, that atactic polypropylene has unusual properties such that it can be used as a surfacing agent to markedly improve the physical properties of a wide variety of substrates such as paper, textiles, wall surfacing compositions such as plaster, soil, wire, etc. Thus, when an organic solvent solution of atactic polypropylene or an aqeuous emulsion containing a dispersed solution of atactic polypropylene, as hereinafter described, is used to treat the surface of a substrate, the water repellency, wet strength, shear strength, and/or dielectric properties of the substrate are significantly improved.

The starting material for the present invention is atactic polypropylene which may be defined as a high molecular weight normally solid polymer of propylene which is soluble in isooctane at room temperature, as distinguished from isotactic polypropylene which is substantially insoluble in isooctane at room temperature. Atactic polypropylene, as thus defined, gives an essentially amorphous X-ray spectrum and has a number average molecular weight ranging from about 1,000 to about 150,000 (Ciampa). A preferred class of atactic polypropylene for use in accordance with the present invention are atactic polypropylenes having a number average molecular weight within the range from about 2,000 to about 50,000 (Ciampa).

The atactic polypropylene starting material for the present invention may be derived from the polymerization product that is obtained by the diluent polymerization of propylene in the presence of a catalyst prepared by the activation of a transition metal compound with a metal containing activator such as diethyl aluminum chloride or triethyl aluminum. Suitable catalyst compositions are disclosed and described, for example, in Schutze U.S. Patent No. 2,845,914. The atactic polypropylene starting material is formed together with isotactic polypropylene. Atactic polypropylene may be obtained, for example, by selectively extracting it from the mixture of atactic (amorphous) and isotactic (crystalline) propylene polymers by treating the mixture with an excess of isooctane or an equivalent aliphatic or aromatic solvent in order to selectively dissolve the atactic portion of the polymer mixture whereby the isotactic portion remains substantially undissolved. As a consequence, a slurry will be formed which can be resolved by any suitable technique such as decantation, filtration, centrifugation, etc., to provide a solution of atactic polypropylene substantially free from isotactic polypropylene.

The method of polymerizing propylene and the recovery of polypropylene, as above described, is known to those skilled in the art, is not a part of the present invention, and is set forth herein as a matter of convenience.

The solution of atactic polypropylene that is obtained when atactic polypropylene is separated from isotactic polypropylene may be used, as such. However, for most purposes, and in accordance with a preferred embodiment of the present invention, it is desirable to utilize a more concentrated solution of the atactic polypropylene or a solution of the atactic polypropylene in a different solvent. The atactic polypropylene as such, or a more concentrated solution thereof, may be obtained as a residue when all or a desired portion of the selective solvent used in the separation step is vaporized from the atactic polypropylene solution.

For many purposes, atactic polypropylene dissolved in a solvent other than customarily used selective solvents is preferred. For example, a noninflammable solvent may be desired. Likewise, a very volatile solvent may be preferred for some purposes whereas a less volatile solvent is preferred for other purposes. Such solutions can be obtained by vaporizing or extracting the selective solvent used for the atactic polypropylene recovery to a minimized content to provide a residue which may then be dissolved in the desired organic solvent.

The organic solvent to be used may be any organic solvent in which the atactic polypropylene is soluble. Thus, the organic solvent to be utilized in accordance with a preferred embodiment of the present invention may include pure compounds and mixtures of compounds selected from the group consisting of paraffinic hydrocarbons, naphthenic hydrocarbons, aromatic hydrocarbons, chlorinated hydrocarbons, esters, alcohols and ethers, etc., such as:

(a) $C_6$ to $C_{12}$ paraffins and naphthenes such as hexane, heptane, octane, isooctane, decane, cyclohexane, cycloheptane, Decalin, etc.;

(b) $C_8$ to $C_{12}$ olefins such as octene, decene, etc.;

(c) Aromatic hydrocarbons such as benzene, toluene, and xylenes;

(d) Mixtures of hydrocarbons such as solvent naphtha, gasoline, kerosene, diesel fuel, etc.;

(e) Chlorinated hydrocarbons such as dichloromethane, chloroform, carbon tetrachloride, poly-chlorinated ethanes of the general formula $C_2H_xCl_y$ wherein $y$ is 3 to 6 and the sum of $x$ and $y$ is 6 (e.g. 1,1,2-trichloroethane, etc.), poly-chlorinated propanes of the general formula $C_3H_mCl_n$ wherein $n$ is 3 to 8 and the sum of $m$ and $n$ is 8 (such as 1,1,3-trichloropropane, etc.), monochlorobenzene, alpha - chlorotoluene, dichlorotoluenes, etc.;

(f) Esters of the general formula $$C_nH_{2n+1}COOC_mH_{2m+1}$$

wherein the sum of $m$ and $n$ is 6 to 16, such as n-butyl acetate, etc.;

(g) Primary $C_8$ to $C_{18}$ aliphatic alcohols and $C_6$ to $C_{10}$ alicyclic alcohols such as tridecyl alcohols, cyclohexanol, etc.;

(h) Ethers of the general formula $C_nH_{2n+1}OC_mH_{2m+1}$ wherein the sum of $m$ and $n$ is 4 to 8, such as diethyl ether, etc.

Normally it will be preferable to employ a saturated solvent solution of atactic polypropylene such as, for example, a 5 to 15 weight percent solution of atactic polypropylene in a solvent as above described.

Also, in accordance with the present invention, aqueous emulsions containing a dispersed solution of atactic polypropylene are provided.

Thus, stable emulsions of atactic polypropylene may be prepared by the agitated blending of an organic solvent solution of atactic polypropylene, as above described, with from about 5 to about 70 wt. percent of water in the presence of from about 0.2 to about 5 wt. percent of a surfactant, said surfactant being one or more members of the general classes of surface active agents selected from the group which includes anionic surface active agents, nonionic surface active agents, and cationic surface active agents, as hereafter described, or a mixture of compatible types of such surface active agents, such as a mixture of one or more nonionic type surface active agents with either one or a plurality of cationic surface active agents or one or a plurality of anionic surface active agents.

Examples of suitable anionic surface active agents include:

(1) Ammonium, substituted ammonium, and alkali metal salts of fatty acids, said salts having the general formula of $C_nH_{2n+1}COOM$ or $C_nH_{2n-1}COOM$ where $n$ is 7 to 19 and M is sodium, potassium or $-NHR_1R_2R_3$ where $R_1$, $R_2$ and $R_3$ is H or $-[(C_2H_4O)_xOH]$ where $x$ is 1 to 30 or $-[(C_3H_6O)_yOH]$ where $y$ is 1 to 30, or $-CH_3$, or $-C_2H_5$ or $-C_3H_7$ (for example ammonium oleate, potassium laurate, sodium stearate, etanolamine oleate and the like);

(2) Ammonium, substituted ammonium, and alkali metal salts of alkylbenzene sulfonic acids, said salts having the general formula

where R is an alkyl radical having the general formula $C_nH_{2n+1}$ and $n$ is 4 to 20 and M is defined immediately above (for example sodium nonylbenzene sulfonate, ammonium dodecylbenzene sulfonate and the like);

(3) Ammonium, substituted ammonium, and alkali metal salts of sulfated alkenoxylated alkylphenols, said salts having the general formula

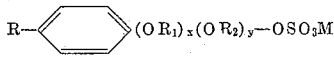

where R is an alkyl radical of the general formula $$C_nH_{2n+1}$$

and $n$ is 4 to 20, $R_1$ and $R_2$ are either $-C_2H_4-$ or $-C_3H_6-$, $x$ is 0 to 30, $y$ is 0 to 30 and the sum of $x$ and $y$ is at least 1, and M is described in section (1) above (for example, ammonium nonylphenoxyethoxyethoxyethyl sulfate, sodium nonylphenoxypropoxyethoxyethyl sulfate, potassium dodecylphenoxyethoxypropoxypropyl sulfate and the like);

(4) Ammonium, substituted ammonium, and alkali metal salts of sulfated alkenoxylated alcohols, said salts having the general formula $R-(OR_1)_x(OR_2)_y-OSO_3M$ where R is an alkyl group of the general formula $$C_nH_{2+1}$$

and $n$ is 7 to 19 and $R_1$, $R_2$, $x$, $y$, and M are as described in the preceding section (such as sodium tridecoxyethoxyethoxyethyl sulfate and the like);

(5) Ammonium, substituted ammonium, and alkali metal salts of alcohol sulfates, said salts having the general formula $C_nH_{2n+1}OSO_3M$ where $n$ is 8 to 20 and M is as previously described in section (1) (such as sodium lauryl sulfate and the like);

Included among the nonionic type surfactants are the following:

(1) Alkenoxylated alkylphenols of the general formula

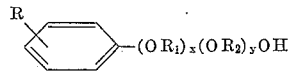

where R is an alkyl radical of the general formula $$C_nH_{2n+1}$$

and $n$ is 4 to 20, $R_1$ and $R_2$ are either $-C_2H_4-$ or $-C_3H_6-$ and $x$ and $y$ are 0 to 40 and the sum of $x$ and $y$ is at least 4 (such as octylphenoxyethoxyethoxyethoxyethanol, otherwise called octylphenol-5 mol ethylene oxide adduct or abbreviated as octylphenol-5 EO, nonylphenol-9 EO, dodecylphenol-10 EO, nonylphenol-4 EO-5 PrO (where PrO indicates propylene oxide adduct) and the like);

(2) Alkenoxylated alcohols of the general formula $C_nH_{2n+1}(OR_1)_x(OR_2)_yOH$ where $n$ is 8 to 20, $R_1$ and $R_2$ are described immediately above, and $x$ and $y$ are 0 to 40 and the sum of $x$ and $y$ is at least 3 (such as tridecyl alcohol-9 EO and the like);

(3) Amides and substituted amides having the general formula $C_nH_{2n+1}-CONR_1R_2$ and $C_nH_{2n-1}CONR_1R_2$ where $n$ is 7 to 19 and $R_1$ and $R_2$ are H, $$-[(C_2H_4O)_xOH]$$

where $x$ is 1 to 30, $-[(C_3H_6O)_yOH]$ where $y$ is 1 to 30, $-CH_3$, $-C_2H_5$, $-C_3H_7$ (for example, lauryl amide, lauryl diethanolamide, oleyl propanolamide and the like).

Included among the cationic surfactants are quarternary ammonium compounds containing at least one large hydrophobic group in the molecule, such as octylphenoxyethoxyethyldimethylbenzylammonium chloride and the like.

A solution or emulsion of atactic polypropylene, after being prepared in the above described fashion, is used in accordance with the present invention for the surface treatment of solid substrates.

The substrate may be any suitable solid material including porous flexible substrates such as paper, textiles, yarns, threads, etc., porous, semi-porous, or impervious flexible or nonflexible substrates including wall surfacing compositions such as plaster, brick, etc., wire, etc., and particulate solid substrates such as soil, sand, gravel, insulating materials, etc.

The manner in which the solution or aqueous emulsions of atactic polypropylene is applied to the surfaces of the substrate will be dependent upon the physical condition of the substrate and the nature of the surface treatment to be effected, thus, for example, the solution or emulsions may be applied to the solid substrate by such techniques as painting, dipping, spraying, brushing, rolling, printing, etc.

In general, it will be desirable to provide for a surface coating of atactic polypropylene having a thickness within the range of about 0.01 to about 10 mils and, more preferably, within the range of about 0.1 to about 1 mil. When coatings having a thickness in excess of about 1 mil are desired two or more successive surface applications of the solution or emulsion may be required.

The amount of solution to be used in treating the substrate will vary, but, in general, the amount will be such that the finally treated substrate, after removal of solvent and/or water will contain from about 0.1 to about 15 wt. percent atactic polypropylene and, more preferably, from about 1 to 10 wt. percent of atactic polypropylene.

The invention will be further illustrated by the following specific examples which are given by way of illustration and not as limitations on the scope of this invention.

Example I

A paper towel was dipped into and slowly withdrawn from a 10% solution of atactic polypropylene in Painter's and Varnish Maker's Naphtha. Excess solution was wiped from the paper with a spatula, and the impregnated paper was dried for 4 hours in an oven maintained at 80° C. The thus treated paper contained about 10 wt. percent of atactic polypropylene and was rendered substantially completely waterproof. The flexibility of the paper was unimpaired and there was only a light waxy hand. By the use of a lesser amount of atactic polypropylene a substantially completely waterproof paper may be provided having unimpaired flexibility and hand properties.

Example II

A 10% chloroform solution of atactic polypropylene was brushed onto ordinary paper towels in a lattice pattern leaving about 1 inch squares of untreated paper enclosed by treated lines having a width of about ⅛ of an inch. Thereafter, the solvent was evaporated at about 80° C. The thus treated paper towel contained about 2 wt. percent of atactic polypropylene. The wet strength of the treated paper was significantly increased, but otherwise the paper towel retained its original properties.

From the foregoing experiments it is seen that paper articles such as paper boxes, paper crates, sheets of paper, including laminated or corrugated sheets, boxes, etc., when treated in accordance with the present invention, are greatly improved in their physical properties for use as electrical insulating materials and shipping containers.

Example III

One half of a piece of cotton cloth was impregnated with a 10% solution of atactic polypropylene in painter's naphtha. The thus treated cloth was air dried for 16 hours and then for 1 hour at 80° C. The treated portion of the cloth retained porosity for the free intermission of air and smoke but had significantly improved water resistance.

Example IV

A bare copper wire was dipped into the atactic polypropylene solution of Example III, air dried in a vertical position for 16 hours and oven dried for 1 hour. As a consequence, a very thin coat of atactic polypropylene having a thickness of less than about 0.3 mil was formed on the wire. However, the insulating effectiveness of this thin coating was sufficient so that no current would flow through the wire when the wire was physically contacted at the surface thereof with probes from an ordinary 115 volt A.C. source.

Example V

Conventional plaster which had been allowed to cure for 16 hours was treated by brushing onto the surface thereof the atactic polypropylene solution of Example III and was then allowed to dry for 6 hours. The surface of the plaster was essentially impermeable to water, whereas untreated plaster absorbed water readily.

Example VI

Ordinary top soil was placed in a dish to a depth of about 1½ inch and the atactic polypropylene solution of Example I was added (about 100 ml. of solution per square foot of soil surface) and the thus added solution was thoroughly mixed into the surface of the soil to a depth of about ¼ inch in a manner to similate common raking. An additional equal amount of solution was then uniformly sprinkled on the surface. The soil was allowed to air dry for 16 hours, at the end of which time the top ¼ inch of the soil was essentially impermeable to water and could be removed intact.

Example VII

Five grams of an ethylene oxide condensate of tridecyl alcohol containing about 9 mols of combined ethylene oxide per mol of alcohol were mixed with 100 grams of the atactic polypropylene solution of Example III and 50 grams of water. The emulsion was stable as evidenced by the fact that it did not resolve after standing for 30 days. A portion of the thus prepared emulsion was used to treat top soil in the manner described above with respect to Example VI. The emulsion was much more effective in wetting the top soil than the solution and gave the top soil both firmness and decreased water permeability after two days of drying.

The value of atactic polypropylene solutions has been partly demonstrated by the above experiments which indicate utility in preparing tents, awnings, tarpaulins, sails, clothing and the like from atactic polypropylene impregnated cloth. The experiments also demonstrate that these solutions provide a convenient electrical insulating material and a convenient water barrier. Thus the solutions may find extended use in preparing roadbeds, building foundations, and for treating the bottoms of earthen water reservoirs and concrete, masonry and plaster surfaces to reduce water loss or damage. These experiments, however, demonstrate only a few useful applications which were discovered for atactic polypropylene solutions. Numerous other useful applications will become obvious from these examples.

Having described my invention, what is claimed is:

A method for improving the firmness of soil and decreasing the water permeability thereof which comprises the steps of agitating a mixture of a 5 to 15 wt. percent organic solvent solution of atactic polypropylene, water and a surfactant to provide a stable aqueous emulsion, incorporating said aqueous emulsion into the surface of soil to improve thereby the firmness thereof and to decrease thereby the water permeability thereof, said aqueous emulsion containing from about 5 to about 70 wt. percent of water and from about 0.2 to about 5 wt. percent of surfactant, the balance of said emulsion being said organic solvent solution of atactic polypropylene.

References Cited in the file of this patent

UNITED STATES PATENTS

| | | |
|---|---|---|
| 2,801,985 | Roth | Aug. 6, 1957 |
| 2,838,466 | Padbury et al. | June 10, 1958 |
| 2,927,047 | Schulde et al. | Mar. 1, 1960 |
| 2,931,740 | Riboni | Apr. 5, 1960 |
| 2,974,559 | Coggi | Mar. 14, 1961 |
| 3,042,640 | Gersie et al. | July 3, 1962 |
| 3,043,787 | Bonvicini et al. | July 10, 1962 |
| 3,073,790 | Bosoni | Jan. 15, 1963 |

FOREIGN PATENTS

| | | |
|---|---|---|
| 538,782 | Australia | Dec. 6, 1955 |
| 561,459 | Belgian | Apr. 8, 1958 |
| 517,831 | Canada | Oct. 25, 1955 |
| 820,727 | Great Britain | Sept. 23, 1959 |
| 1,221,500 | France | June 2, 1960 |